June 12, 1923.

S. W. FERGUSON

CHANGE SPEED MECHANISM

Filed July 12, 1920 5 Sheets-Sheet 1

1,458,400

Witness
A S Halsey

Inventor
S. W. Ferguson
By Frank A. Kane, Attorney

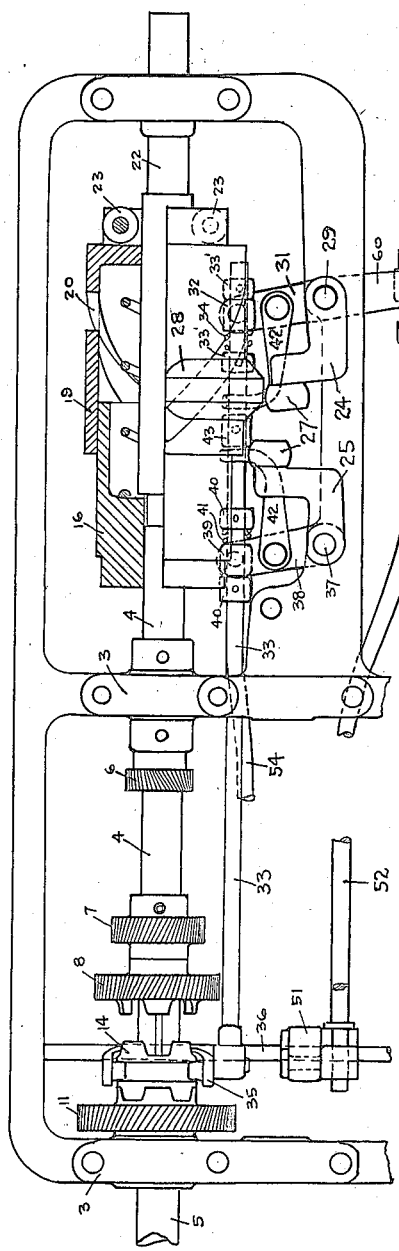

June 12, 1923.
S. W. FERGUSON
1,458,400
CHANGE SPEED MECHANISM
Filed July 12, 1920    5 Sheets-Sheet 3
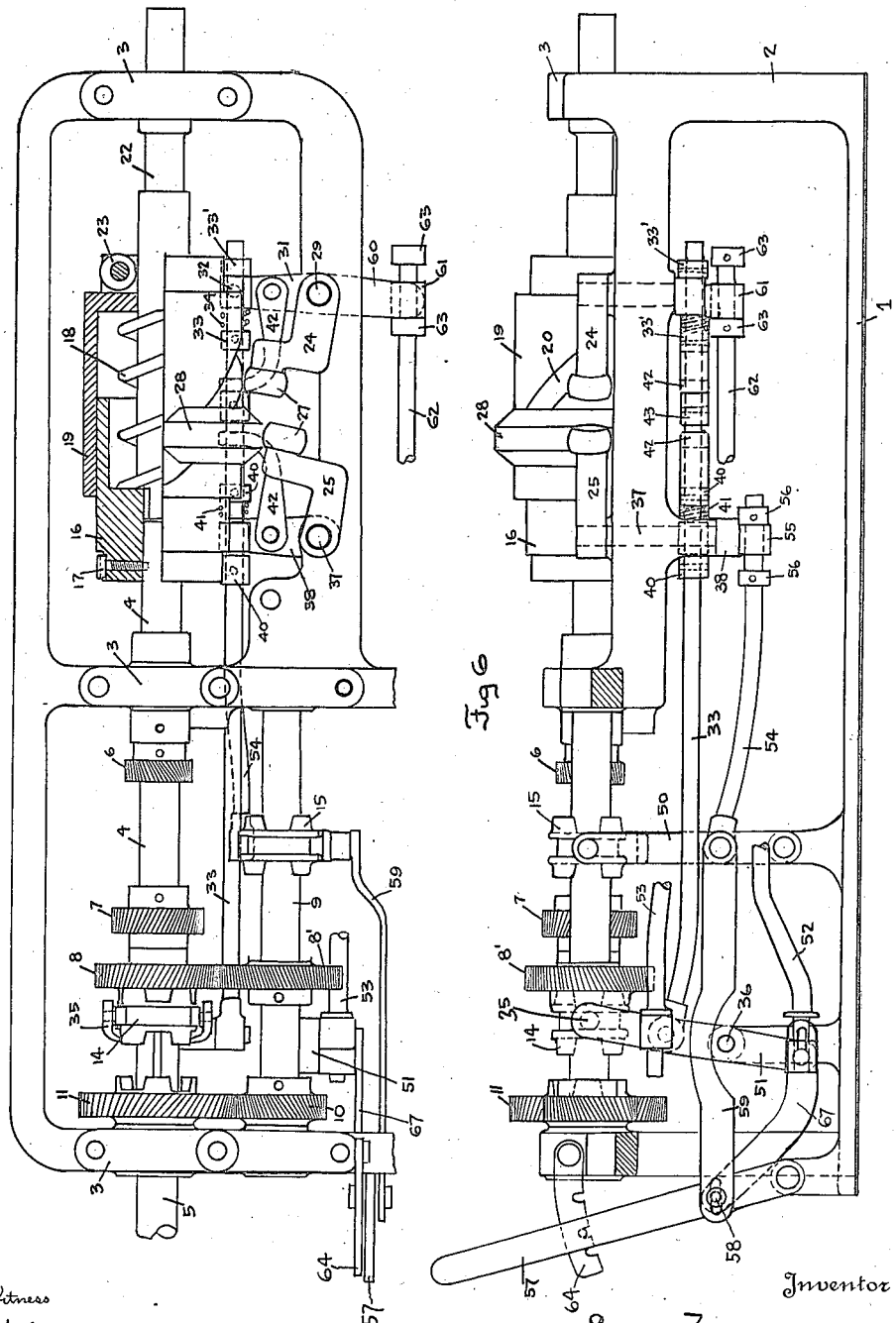
Witness
A. S. Halsey
Inventor
S. W. Ferguson
By Frank A. Kane
Attorney

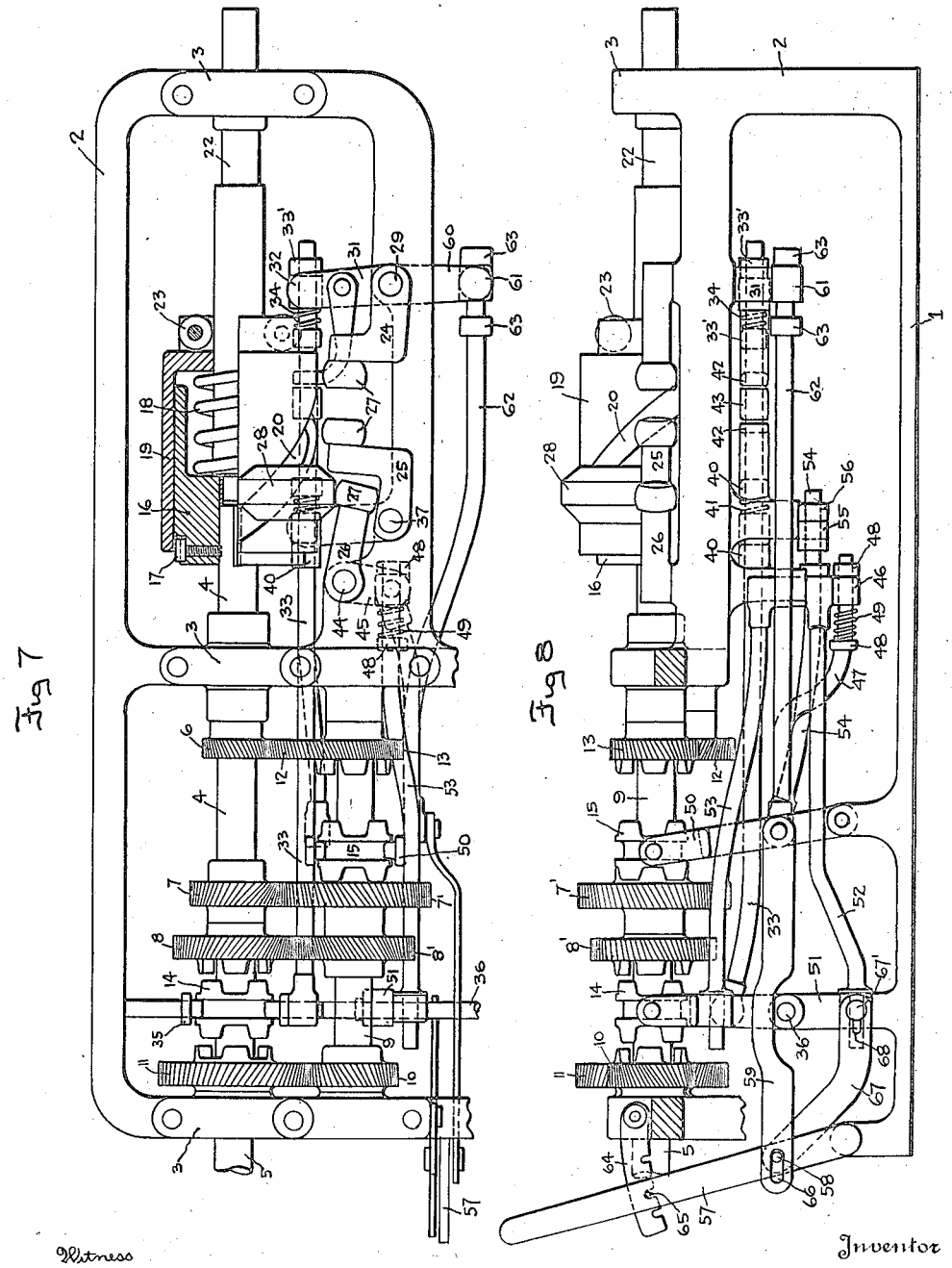

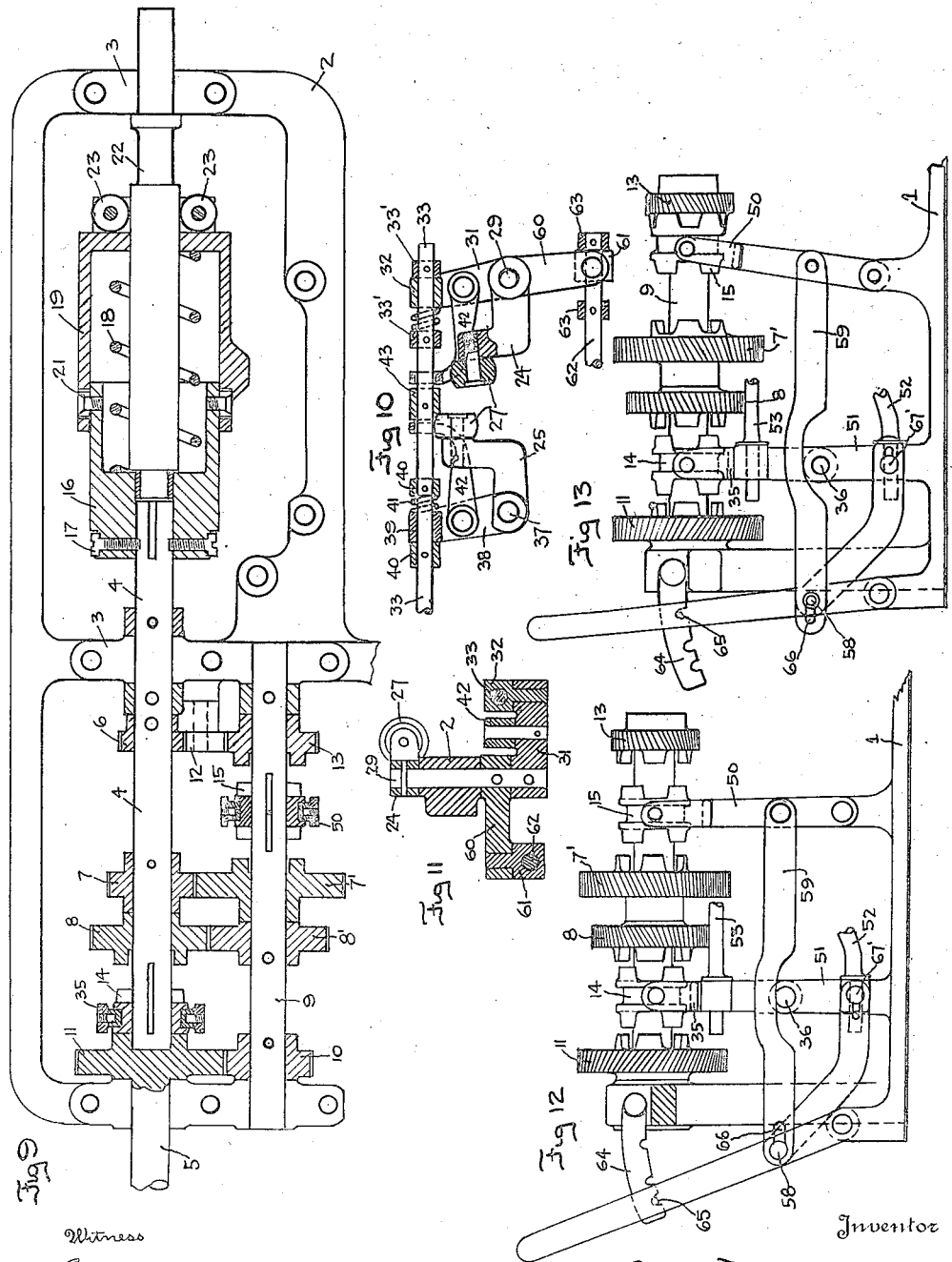

Patented June 12, 1923.

1,458,400

UNITED STATES PATENT OFFICE.

SAMUEL W. FERGUSON, OF WASHINGTON, DISTRICT OF COLUMBIA.

CHANGE-SPEED MECHANISM.

Application filed July 12, 1920. Serial No. 395,610.

*To all whom it may concern:*

Be it known that I, SAMUEL W. FERGUSON, a citizen of the United States, residing at Washington, District of Columbia, have invented certain new and useful Improvements in a Change-Speed Mechanism, of which the following is a specification, reference being had therein to the accompanying drawings.

This invention relates to change speed mechanism. It is contemplated to produce mechanism of this character which will be automatic in its operation; wherein devices adapted to be associated with power transmitting instrumentalities such as gearing, clutches, drive and driven shafts are actuated according to the strain imposed on the transmission to change the arrangement and association of the gearing and clutches; wherein the change in the arrangement of the clutches and gearing will be controlled automatically by a force or torque representing the resistance between the load and power applied.

It is contemplated to provide, in connection with the automatic mechanism, manual control whereby the parts may be positively locked in either inoperative, neutral, or reverse position; wherein there will be a positive connection between the various clutches so arranged that it will be impossible to place one in operation without rendering any of the others inoperative; wherein a certain elasticity of movement will be provided in effecting clutch actuation, so that any tendency of the dogs or engaging portions to jam will be compensated and the engagement effected silently and positively upon a further movement of the parts.

Further objects are to connect a source of power with a take-off in such a manner that there will be several speeds forward, a neutral, inoperative and reverse mechanism disposed between these points; wherein clutches and gearing for effecting the changes of speed will be so interconnected that movement of one will be transmitted to another in such a way that only one unit will be effective at any time; wherein automatic movement of the clutches is effected by a mechanism which translates the strain on the power devices into a rotary and axial movement against a predetermined resistance, and this movement is utilized to actuate the various clutches. Other objects and advantages will be in part apparent and in part be brought out more fully in the description which follows.

Drawings, illustrating an embodiment of the invention are hereto annexed, the following views being shown:—

Fig. 3, is a view in top plan, partly in section, showing rather diagrammatically third speed connections;

Fig. 4, is a view in side elevation of the same;

Figs. 5 and 6 are views corresponding to Figs. 3 and 4, and illustrating intermediate or second speed connections;

Figs. 7 and 8, are similar views illustrating first or low speed connections;

Fig. 9, is a view in horizontal section illustrating in detail the arrangement of the change speed gearing and shiftable clutches on their respective shafts, the relationship of these parts, and the manner of connecting the torque control device with the drive shaft and gearing;

Fig. 10, is a view in detail, partly in section and showing connections between direct and second speed control mechanism;

Fig. 11, is a view in vertical section of the same;

Figs. 12 and 13 are views in fragmentary detail showing parts in locked inoperative and reverse positions respectively.

Figure 1:
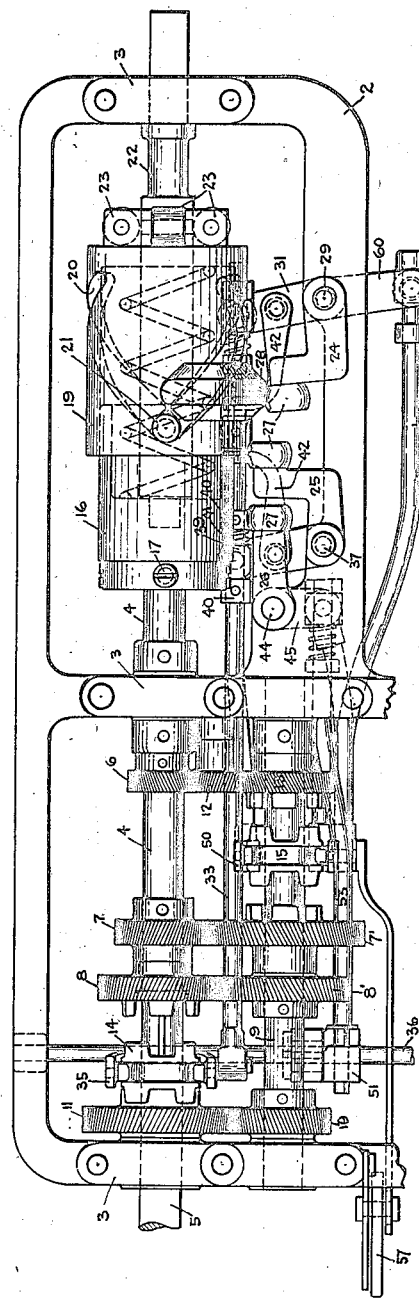
Fig. 1, is a view in top plan of a device embodying my invention, a portion of the casing being broken away.

Referring specifically to these drawings, 1 designates a base, which may be a portion of a gear box, casing, or housing. Upon this base there are mounted uprights 2, which may be the sides and ends of the casing, and by these are carried bearings 3.

Disposed in these bearings there is a shaft 4, at one end adapted to be in driven connection with a source of power, and at its other end carrying a stub or extension 5. For convenience of description, the shaft 4 will be referred to as the drive shaft and the part 5 as the driven shaft.

Change speed gearing is interposed between the drive shaft 4 and driven shaft 5. As here shown there are two gears 6 and 7 secured to the drive shaft 4 for rotation with it, and another gear 8 loosely mounted thereon. Associated with shaft 4 is an auxiliary or jack-shaft 9, mounted at its extremities in extended portions of bearings 3. This shaft has secured thereto, at one end, a gear 10, which is in mesh with a gear 11 secured to the stub or driven shaft 5. Jack-shaft 9 has a gear 8' secured thereto and in mesh with gear 8 on shaft 4; also a loose gear 7' in mesh with gear 7 secured to shaft 4. These, except gear 6, comprise the forward combination. Gear 6, meshing with a gear 12, mounted in suitable bearings on the framework, and the latter meshing again with a gear 13 mounted loosely on jack-shaft 9, comprise the reverse combination.

Means are provided for changeably connecting the gears to the shafts. To this end there is a clutch 14 splined on shaft 4, and a clutch 15 similarly mounted on shaft 9. These may be of any suitable construction, the ones here shown being double-faced and provided with teeth or teeth which cooperate with corresponding faces upon the gears they are to engage. When clutch 14 is in engagement with gear 11 and clutch 15 is disengaged, there is a direct connection between shafts 4 and 5 through the teeth on gear 11 and clutch 14. This may be seen clearly in Fig. 9, and comprises the third speed or direct drive.

When the teeth on the opposite face of clutch 14 are in engagement with those on gear 8, an intermediate or second speed is effected. This may be seen with reference to Figs. 5, 6 and 9. The connections are through shaft 4 and clutch 14 with gear 8, through gear 8' and 10 on jack shaft 9, with gear 11 on shaft 5.

When clutch 15 is in engagement with gear 7' and clutch 14 disengaged, a first or low speed connection is effected. This may be seen with reference to Figs. 7, 8 and 9. The connections are through drive shaft 4 and gear 7 fixed thereon to jack-shaft 9, through loose gear 7' and clutch 15, now connected with gear 7'; then through gear 10 secured to jack-shaft 9 and gear 11 secured to shaft 5. Gears 7 and 10 are proportionally small and gears 7' and 11 proportionally larger.

When the opposite face of clutch 15 is in engagement with gear 13, the reverse connection is effected. This may be seen with reference to Figs. 13 and 9. Motion is then imparted from drive shaft 4, through gear 6 secured thereto and idler 12 to gear 13. The latter being now clutched to shaft 9 by clutch 15, there is a connection, through gears 10 and 11 with shaft 5. The interposition of idler 12, causes rotation of shafts 4 and 9 in the same direction. Gear 10, secured to shaft 9, communicates this movement, in reverse direction, to driven shaft 5.

Means are provided for automatically controlling the actuation of the clutches and consequently the change speed gearing. It is intended to have a definite but variable relation between the strain or torque created between the source of power and take-off and the particular speed control effected. In other words, if the strain is high, the low speed will be actuated. As the strain lessens the intermediate or direct drives will be brought into play. To this end there is provided a torque or strain controlled actuating instrumentality which may best be seen with reference to Figs. 1, 7, and 9. As here shown it includes a member 16, having at one end a shaft embracing portion, secured to and adjustable on drive shaft 4, as by means of a set screw or jam-nut 17. The opposite end of member 16 is cylindrical and shaped interiorly to constitute a housing for and shoulder against which a resistance element such as a spring 18 can bear. Cooperating with member 16 is another member 19, in the form of a cylindrical drum, the inner surface of which, at one end, is in sliding engagement with and embraces the outer cylindrical surface of member 16. The outer member 19 is provided with spirally arranged grooves 20, pitched at an angle to the axis of the drum, and tracking in these grooves are rollers 21, secured to member 16. The other end of member 19 is arranged to have reduced frictional travel on a squared or angulated portion of a shaft 22. Rollers 23, disposed on member 19 and bearing against a squared portion of shaft 22 are here shown. The shaft 22 has a bearing at one end in one of the bearings 3, and at its opposite end is arranged for rotative movement within the shaft embracing portion of member 16. The instrumentality just described comprises a torque controlled actuating instrumentality associated with shaft 4, whereby rotation transmitted to shaft 4 is first translated into a longitudinal movement of member 19 against the resistance of spring or tension element while the rollers 21 climb the pitched groove 20 in member 19. In other words any strain between the source of power and shaft 4 is utilized by the instrumentality just described as an actuating means for the clutches and gear changing. The amount of resistance is variable and adjustable both by the adjusting means 17 and by the pitch of the grooves, and the nature of the resistance element used. As the rollers 21 climb the grooves in movable member 19, the latter receives both a rotary and longitudinal movement and this is utilized to operate clutch actuating levers. These, and the connections between them and the clutches will now be described.

Suitably mounted in proximity to the drum 19 and adapted to be actuated thereby, are a plurality of levers or actuating members 24, 25, and 26. Two of these, 24 and 25, are here shown as bell-crank levers, arranged to throw in opposite directions and each of them is provided, at the power end, with a friction reducing means such as a ball or roller 27. For engagement with roller 27 to actuate these levers, there is provided a beveled cam actuating member 28, mounted on drum 19. As the drum moves longitudinally of shaft 22, this cam 28 will engage the roller 27 on any of these levers which may be in its path and move the lever in a direction away from the drum.

This movement of the levers is transmitted to the clutches by a series of interconnected members, so arranged, that only one clutch can be in operative connection between the drive and driven shaft at one time. In other words, movement of a lever to effect direct drive while a clutch is in place for intermediate speed, will first effect a disengagement of the intermediate clutch and then move the clutch into engagement with the other gear.

Starting with the first clutch actuated by the drum, which is the direct or high speed, reference will be had particularly to Figs. 1, 2, 3, and 4. In the embodiment here shown cam 28 is normally in position to actuate lever 24 which controls direct or high speed. It is to be understood as within the scope of the invention to change this arrangement so that low speed could be primarily effected. Lever 24 is secured to a pivot 29, having a bearing on a portion of the casing. The pivot is extended downwardly and has secured to its lower end an arm 31, carrying a yoke 32, through which passes one end of a clutch actuating rod 33. Collars 33' are secured to the rod on either side of the yoke, and a resilient connection is effected as by the interposition of a spring 34 between the yoke and one of the collars. The opposite end of rod 33 is secured to a clutch actuating yoke 35, pivotally mounted on a rock-shaft 36 disposed in bearings on the casing. The upper portion of yoke 35 embraces clutch 14 in the well known form of spanner, permitting rotation of the clutch with the shaft, but effecting movement longitudinally thereof. Movement of bell-crank lever 24 by cam 28 will cause that portion of arm 31 which is connected to rod 33 to move to the left in Figs. 1, and 3, and this movement is communicated, through rod 33 and yoke 35 to clutch 14, placing it into engagement with gear 11. Should the dogs on the gear and clutch not immediately engage, spring 34 between collar 33' and arm 31 will permit a yielding of the rod until rotation of shaft 4 brings the dogs into proper alignment when they are positively engaged under pressure of the spring.

A movement of clutch 14 in the opposite direction to effect intermediate speed is initiated by bell-crank lever 25, which is also secured to a pivot 37 suitably journaled on the casing. This pivot carries an arm 38 having a yoke 39 loosely embracing rod 33 and working between collars 40 secured to the rod. A spring 41 is interposed as above described to permit elasticity in the connection to facilitate engagement of the dogs. Lever 25 works in the same manner as lever 24 just described, but in a reverse direction, swinging yoke 35 and clutch 14 to the right, the latter to engage gear 8.

Means are provided for removing clutch 14 from gear 11 should the lever 25 be actuated while lever 24 is already in operation to effect direct drive. In other words, levers 24 and 25 and the connections just described are again under control of interposed instrumentalities the purpose of which is to permit actuation of lever 25 even while lever 24 is in operation, the arrangement being such that lever 24 will first of all be rendered inoperative and returned to its normal position with relation to cam 28, during which movement lever 25 will be independently functioning to effect connection of gear 8 and clutch 14 for intermediate speed. The mechanism to be described is shown in detail in Figs. 10 and 11, and includes connection members 42, having at one end, a bearing on arms 31 and 38 respectively. The opposite ends of these members are in the form of yokes embracing rod 33, and between the yokes there is a collar 43 secured to the rod. These members and the collar effect an interconnection between levers 24 and 25 through rod 33, arms 31 and 38 and are instrumental in removing clutch 14 from either of the gears with which it may be engaged. This action may be seen with reference to Fig. 10. If arm 25 is moved in a direction away from rod 33, the yoke on the left hand member 42, attached to arm 38, will engage collar 43, and through the yoke on right hand member 42 and its connection with arm 31, lever 24 will be moved in a direction toward rod 33. In either event, rod 33 is moved, and through its connection with clutch 14, the latter moves with the rod. The effect of this arrangement is to alternately actuate the clutch according to which of the levers 24 or 25 is moved by the cam. It will be readily seen that the action of one of these levers will be duplicated by the other but in just the opposite direction.

Means for moving clutch 15 into engagement with gear 7' to effect first or low speed are shown particularly in Figs. 7 and 8. Lever 26 is secured to a pivot 44 mounted on the casing, and having secured to its lower end an arm 45 in angular relation to the lever. Arm 45 carries a yoke 46 loosely embracing one end of a rod 47 and working between collars 48 secured to the rod. A spring 49 is interposed between the yoke and one of the collars to permit a certain elasticity of connection as before described and the other end of the rod is secured to a clutch shifting yoke 50. This is suitably pivoted, at one end on the casing, and at its other end carries spanner arms embracing the clutch members 15. Actuation of lever 26 by cam 28 will move the lever back, swinging arm 45 to the left. This movement is communicated, through rod 47 to yoke 50 and clutch members 15. If the dogs on the clutch and gear 7' do not immediately engage, spring 49 yieldingly holds these members together until the rotation of one of the shafts allows the complete engagement.

Means are also provided for so interconnecting the first speed lever 26 with levers 24 and 25 controlling the high and intermediate speeds, that should either of the latter be in use when first speed lever 26 is actuated, there will first of all be a withdrawal of the clutch controlled by either of the other levers to a neutral position.

To remove clutch 14 from engagement with gear 11 or high speed, when lever 26 is actuated to effect low speed, there is secured to rock shaft 36 a rock arm 51 which moves with clutch yoke 35 and carries at its lower end a yoke embracing loosely one end of a rod 52. This rod has a shoulder at this end for pushing rock arm 51 to the left and at its other end is connected pivotally to arm 45. There is similarly connected to arm 51 on the other side of rock-shaft 36, a rod 53, the other end of which is pivotally connected with arm 45. It will be seen that when lever 26 is moved back by cam 28, arm 45 is swung to the left. This movement is communicated by rods 52 or 53 to rock arm 51, and through it and rock shaft 36 to yoke 35 which controls clutch 14. If the latter is in engagement with gear 11 to effect direct or high speed, arm 51 will be pushed at its lower end by rod 52, swinging both arm 51 and the yoke 35 to a neutral position between gears 8 and 11. If clutch 14 had been in connection with gear 8 to effect intermediate or second speed connections, it would be swung to the left by rod 53 pushing against the upper portion of rock arm 51 which is connected to the clutch shifting yoke 35 through rock shaft 36. It will be also seen that any movement of the second or high speed controlling instrumentalities which is effected through the connections with low speed lever 26 just described, will be transmitted to the low speed connections in the same manner if either of the others is actuated. By permitting a free movement to the left between rock arm 51 and the ends of rods 52 and 53, either high or low speed may be effected by moving clutch 14 to either the right or left in Figs. 5 and 6 if clutch 15 is in neutral position. In other words, when clutch 15 is in neutral position, rock arm 51 has free movement relatively on the ends of rods 52 and 53. There is a rod 54 pivotally connected at one end to clutch shifting yoke 50, and at its opposite end embraced loosely by a yoke 55 carried by arm 38. This yoke has movement along the rod between limit stops 56 secured to the rod, the arrangement being such that when clutch 15 is in neutral position, arm 38 will be free to move to the left, but if clutch 15 were in engagement with gear 7' to effect first speed and intermediate speed lever 25 were actuated, rod 54 would be drawn to the right in Fig. 6, placing clutch 15 in neutral. The opposite action would be effected if the clutch were in engagement with gear 13 to effect reverse, and further cooperation will be brought out in connection with the reverse mechanism which will now be described.

Means are provided for effecting a reverse, a locked inoperative and a neutral position of the clutches wherein the automatic action may be effected. As here shown, these three are manually controlled in such a manner that all of the connections above described are under the direct control of a lever and act as a unit with it to effect the positions mentioned. As here shown a control lever 57 is fulcrumed at one end on the casing, and has, intermediate its ends, a power applying point 58. Connecting this point or pivot, there is a link 59, which may best be seen in Figs. 2, 12, and 13. The other end of link 59 is connected to an extension carried by yoke 50 at the point where rods 47 and 54 are connected to the yoke. Movement of the lever to the right will be communicated through link 59 to yoke 50, and carrying clutch 15 into engagement with gear 13. This effects a reversal of the driven shaft as previously described.

Figure 2:
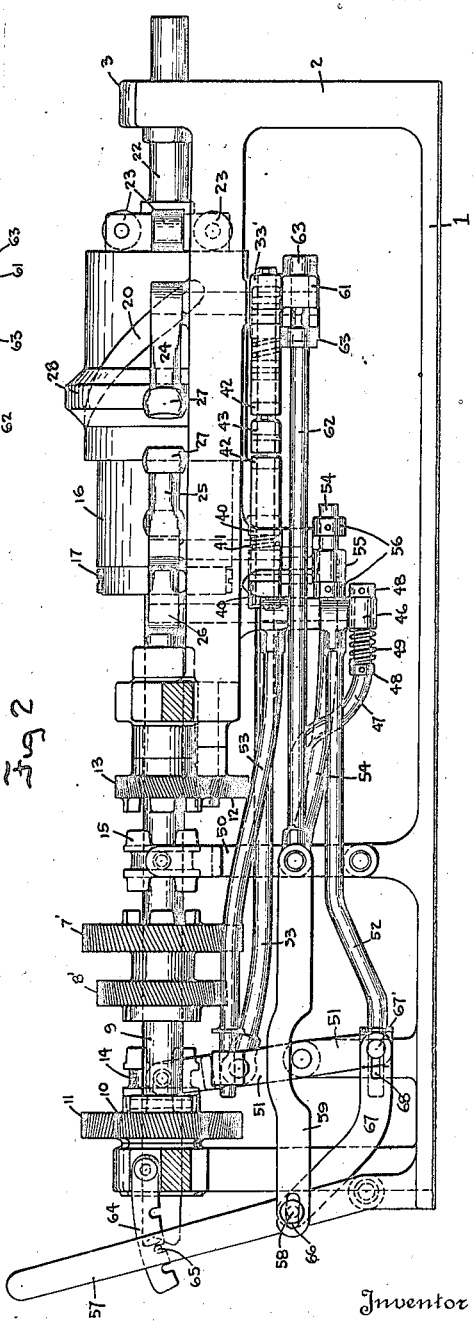
Fig. 2, is a view in side elevation of the same.

Means are provided for effecting a disengagement of any of the direct speed levers and connections which may be operative when lever 57 is swung to the right to bring the reverse mechanism into operation. To this end, pivot 29 on lever 24, carries an outwardly extending arm 60 in the reverse direction to arm 31 and best seen in Figs 1, 2, and 7. This arm 60 has a yoke 61 embracing one end of a rod 62, collars 63 confining the movement of the yoke along the rod. The other end of rod 62 is secured to clutch shifting yoke 50. When second speed is in engagement yoke 61 and collar 63 will be in the position shown in Fig. 5. Should lever 57 be moved to the right to effect the reverse connections link 59 will swing yoke 50 on its pivot in a direction toward the right as seen in Fig. 2. Rod 62 being connected to this yoke, will also move to the right and carry arm 60 in the same direction. (See Fig. 10). Arm 31 will be moved in the opposite direction, and through its connection with rod 33, clutch 14 will be placed in neutral position. If direct or high speed is operating as shown in Fig. 2, movement of lever 57 to the right will, through link 59, yoke 50, and rod 54, swing yoke 55 to the right, and through connections move rod 33 to the right, carrying clutch 14 to neutral position.

For placing the parts in a neutral operative position there is a slot 66 in the end of link 59 which is connected to lever 57. This slot is arranged so that when the detent 65 is in the middle notch of rack 64, the parts connected to the lever, through the link will be allowed full play.

For positively locking all of the parts in neutral or inoperative position there is provided a link 67, at one end secured to pivot 58 and at the other end connected to a pivot 67' on rock arm 51. The end of the link 67 has a slot 68 at the point of connection, the arrangement being such when detent 65 is in the last notch to the left in Fig. 12, clutches 14 and 15 will be locked in neutral position. Should direct speed be working when this movement is effected, link 67 pulls on the lower end of rock-arm 51, swinging clutch 14 to neutral. Should intermediate be engaged, the opposite result will be effected, link 67 pushing on the lower end of rock-arm 51 and swinging the clutch to neutral. The levers connected with these operations are placed in neutral position by rods 52 and 53 as previously described, and through rod 33 and connections. If clutch 15 had been in engagement with either of the gears 7' or 13, it would be moved to neutral by the connections between yoke 50 and rock arm 51 through rods 52, 53 and the connections above described.

What I claim is:—

1. Automatic change speed mechanism including a driving member; a driven member; gearing operatively associated therewith; clutch mechanisms for connecting and disconnecting certain sets of gears; a torque mechanism operable by the strain between the driving and driven members; a plurality of levers operably associated with the torque mechanism; operative instrumentality connecting the levers and clutch mechanisms; and a lever actuating member associated with the torque mechanism and shiftable thereby into position to positively operate the levers.

2. The structure set forth in claim 1 wherein there is a lever corresponding to each change of speed; and wherein the lever actuating member is shiftable into position to successively actuate the levers.

3. The structure set forth in claim 2; and means associated with the levers for withdrawing one clutch mechanism and rendering it inoperative when another clutch mechanism has been operated.

4. The structure set forth in claim 3, wherein the withdrawing means include a rod connecting the lever and clutch; a collar on the rod; and a slidable connection between the rod and another lever.

5. The structure set forth in claim 2; a reverse gearing; a clutch associated therewith; and means for rendering any of the other clutch mechanisms inoperative when the reverse gearing is connected to its clutch.

6. The structure set forth in claim 5, wherein such means include a rod connecting the clutch member at one end; a lever pivotally connected to its opposite end, one end of the lever being connected to the rod and the other end of the lever being connected to the change speed mechanism.

7. Automatic change speed mechanism including a driving member; a driven member; gearing associated therewith; an instrumentality for connecting and disconnecting certain of the gears to effect ratio changes; means operable by the strain between the driving and driven members, for actuating the gear connecting instrumentality; and means for positively locking the mechanism in inoperative position.

8. Automatic change speed mechanism including a drive shaft; a driven shaft; gearing connecting these shafts; clutch mechanism associated with the gearing to effect a plurality of speeds of one of the shafts; means controlled by the strain between the shafts, for actuating each of the change speeds successively; and means for rendering the clutch mechanism inoperative to connect one gear when the clutch has been operated to connect another gear successively.

9. The structure set forth in claim 8 wherein the means for rendering one of the mechanisms inoperative as last set forth includes means connecting the clutch and strain controlled mechanisms; and an elastic member associated therewith whereby a temporary engagement of the clutch is permitted until rotation of one of the shafts effects positive connection.

In testimony whereof I affix my signature.

SAMUEL W. FERGUSON.